United States Patent
Cha

[11] Patent Number: 6,045,663
[45] Date of Patent: Apr. 4, 2000

[54] PROCESS FOR MICROWAVE ENHANCEMENT OF WET OXIDATION

[76] Inventor: Chang Yul Cha, 3807 Reynolds St., Laramie, Wyo. 82072

[21] Appl. No.: 09/064,266

[22] Filed: Apr. 22, 1998

[51] Int. Cl.[7] ............................. C07C 2/00; A62D 3/00; C02F 1/68
[52] U.S. Cl. ..................... 204/157.15; 210/761; 588/227
[58] Field of Search ...................... 204/157.15; 588/227; 210/761

[56] References Cited

U.S. PATENT DOCUMENTS 4,219,415   8/1980   Nassef et al. .............................. 210/32

OTHER PUBLICATIONS

Concise Science Dictionary, p. 445, 1984 no month available.

Capezzuto et al., "The Oxidation of Methane with Carbon Dioxide, Water Vapor and Oxygen in Radio–Frequency", Commun. –Symp. Int. Chim. Plasmas, 3rd., vol. 2, G.5.11, 7pp., 1977 abstract only.

Kiely, *Enviromental Engineering*, pp 603–5, 728–30, McGraw–Hill, NY 1996. no month available.

Williams, "The Loprox route to wet oxidation," 4, pp 28–9, *World Water and Environmental Engineering*, 1997. no month available.

Kirk–Othmer, *Encyclopedia of Chemical Technology*, vol. 15, 3rd Edition, pp 494–522, 1981. no month available.

Kirk–Othmer, *Encyclopedia of Chemical Technology*, Supp. vol., 3rd Edition, 599–608, 1981. no month available.

*Primary Examiner*—Edna Wong
*Attorney, Agent, or Firm*—John O. Mingle

[57] ABSTRACT

Wet oxidation is enhanced in the presence of carbonaceous material by oxidizing adsorbed organic materials, such as hydrazine and various solvents which may contain, or have dissolved or mixed compounds containing, chlorine molecules, on the carbon surface by radiofrequency energy in the microwave range at near ambient conditions of temperature and pressure. The discharged water is substantially environmentally clean.

3 Claims, 3 Drawing Sheets

PROCESS FOR MICROWAVE ENHANCEMENT OF WET OXIDATION

BACKGROUND OF INVENTION

1. Field of Invention

The present invention relates to a process using radiofrequency microwave energy to enhance wet oxidation of materials often of a hazardous nature.

2. Background

Wet air oxidation (WAO), a common subcategory of wet oxidation, is the oxidation of chemical substances that often represent hazardous materials whereby the oxidation products are usually of a nonhazardous nature. Generally such chemicals are organic substances or materials, often referred to just as organics and restricted to only non-biological material, and represent a constituent of contaminated water, so the oxidation reaction occurs in the presence of water molecules.

WAO is an attractive pollution-control process because it is an enclosed process and has very limited interaction with the environment, and further the waste or contaminants are destroyed, instead of merely being broken down into another form of pollution. In most instances the end products are carbon dioxide and water; however, in some cases various carboxylic acids are formed.

In many instances the source of oxidation is an air stream thus leading to the designation WAO, but pure oxygen is potentially usable. In order for oxidation to occur in the WAO process the temperature and pressure must be elevated. Typical temperatures employed are from 150–325° C. while pressures are typically in the range of 2000–20,000 kPa. In most WAO processes agitation is employed to transfer oxygen from the gas phase to the liquid phase where the oxidation reaction occurs at these elevated conditions. A common usage for WAO is the treatment of high-concentration wastewater where a 70+ percent reduction in chemical oxygen demand (COD) occurs after about one hour at approximately 250° C. and 2.5 MPa. Substituting pure oxygen for air increases the COD removal efficiency. For a summary of some typical WAO uses see Kiely, *Environmental Engineering*, pp 603–605, 728–730, McGraw-Hill, N.Y. 1997.

Conventional WAO has been improved by the utilization of a catalyst which speeds up the oxidation process and generally allows the use of lower temperatures and pressures. One common catalyst is platinum. Another is an iron-based catalyst, and used with wastewater, this is called the Loprox process. For instance, see Williams, "The Loprox Route to Wet Oxidation," Volume 4, pp 28–29, *World Water and Environmental Engineering*,1997.

In the subject case the oxidation of the hazardous waste material hydrazine is a primary consideration along with further organics, such as various solvents which may contain, or have dissolved or mixed compounds containing, chlorine molecules.

Hydrazine or its derivatives, monomethyl hydrazine and unsymmetrical dimethyl hydrazine, are common spacecraft propellants for use in missiles, rockets, and space launch vehicles. When used as such an astronautics fuel, nitrogen tetroxide is the most common oxidizer. However around space launch areas, much wastewater containing dilute hydrazine occurs and must be environmentally cleaned up. Microwave enhanced wet oxidation appears as a favorable process to perform this clean up task.

Quantum radiofrequency (RF) physics is based upon the phenomenon of resonant interaction with matter of electromagnetic radiation in the microwave and RF regions since every atom or molecule can absorb, and thus radiate, electromagnetic waves of various wavelengths. The rotational and vibrational frequencies of the electrons represent the most important frequency range. The electromagnetic frequency spectrum is usually divided into ultrasonic, microwave, and optical regions. The microwave region is from 300 megahertz (MHz) to 300 gigahertz (GHz) and encompasses frequencies used for much communication equipment. For instance, refer to Cook, *Microwave Principles and Systems*, Prentice-Hall, 1986.

Often the term microwaves or microwave energy is applied to a broad range of radiofrequency energies particularly with respect to the common heating frequencies, 915 MHz and 2450 MHz. The former is often employed in industrial heating applications while the latter is the frequency of the common household microwave oven and therefore represents a good frequency to excite water molecules. In this writing the term "microwaves" is generally employed to represent "radiofrequency energies selected from the range of about 500 to 5000 MHz", since in a practical sense this total range is employable for the subject invention.

The absorption of microwaves by the energy bands, particularly the vibrational energy levels, of atoms or molecules results in the thermal activation of the nonplasma material and the excitation of valence electrons. The nonplasma nature of these interactions is important for a separate and distinct form of heating employs plasma formed by arc conditions of a high temperature, often more than 3000° F., and at much reduced pressures or vacuum conditions. For instance, refer to Kirk-Othmer, *Encyclopedia of Chemical Technology*, 3rd Edition, Supplementary Volume, pages 599–608, Plasma Technology. In microwave technology, as applied in the subject invention, neither condition is present and therefore no plasmas are formed.

Microwaves lower the effective activation energy required for desirable chemical reactions since they can act locally on a microscopic scale by exciting electrons of a group of specific atoms in contrast to normal global heating which raises the bulk temperature. Further this microscopic interaction is favored by polar molecules whose electrons become easily locally excited leading to high chemical activity; however, nonpolar molecules adjacent to such polar molecules are also affected but at a reduced extent. An example is the heating of polar water molecules in a common household microwave oven where the container is of nonpolar material, that is, microwave-passing, and stays relatively cool.

In this sense microwaves are often referred to as a form of catalysis when applied to chemical reaction rates. For instance, refer to Kirk-Othmer, *Encyclopedia of Chemical Technology*, 3rd Edition, Volume 15, pages 494–517, Microwave Technology.

SUMMARY OF INVENTION

The objectives of the present invention include overcoming the above-mentioned deficiencies in the prior art and providing a potentially economically viable process for the microwave enhancement of wet oxidation.

Wet oxidation is enhanced in the presence of activated carbon or its equivalent by oxidizing adsorbed organic materials on the carbon surface by radiofrequency energy in the microwave range at near ambient conditions of temperature and pressure.

DETAILED DESCRIPTION OF INVENTION

Microwaves are a versatile form of energy that is applicable to enhance chemical reactions since the energy is locally applied by its largely vibrational absorption by nonpolar molecules and does not produce plasma conditions. Particularly reactions that proceed by free-radical mechanisms are often enhanced to higher rates because their initial equilibrium thermodynamics is unfavorable. A second class of enhanced reactions are those whose reaction kinetics appear unfavorable at desirable bulk temperature conditions.

Carbonaceous material is an excellent microwaves absorber since it has a wide range of polar impurities that readily interact with such radiofrequency energy especially in vibrational modes. Consequently the microwave waveguide design for the microwave cavity is not usually critical. Carbonaceous material for use with the subject invention commonly comprises activated carbon, char, soot, pyrolytic carbon, carbon black, activated charcoal, and metal carbides, especially silicon carbide. In most instances activated carbon is the preferred material to employ with a water medium under ambient temperature and pressure conditions, although activated charcoal, if readily available, might be more cost effective.

The microwave excitation of the molecules of the carbonaceous material also excites the organic constituents which have been adsorbed on the internal pore surfaces of the carbonaceous material and produces a highly reactive condition with the oxygen present. The oxygen is in close proximity or within the surface boundary layer of the carbon surface through chemisorption, absorption, adsorption, or diffusion. Oxidation of the organics then proceeds rapidly.

The oxygen does not need to be only in the gaseous form of $O_2$, but can also be with a selected oxygen containing molecule, such as $H_2O_2$ and $O_3$. The use of hydrogen peroxide or ozone will accelerate the wet oxidation rate.

Figure 1:
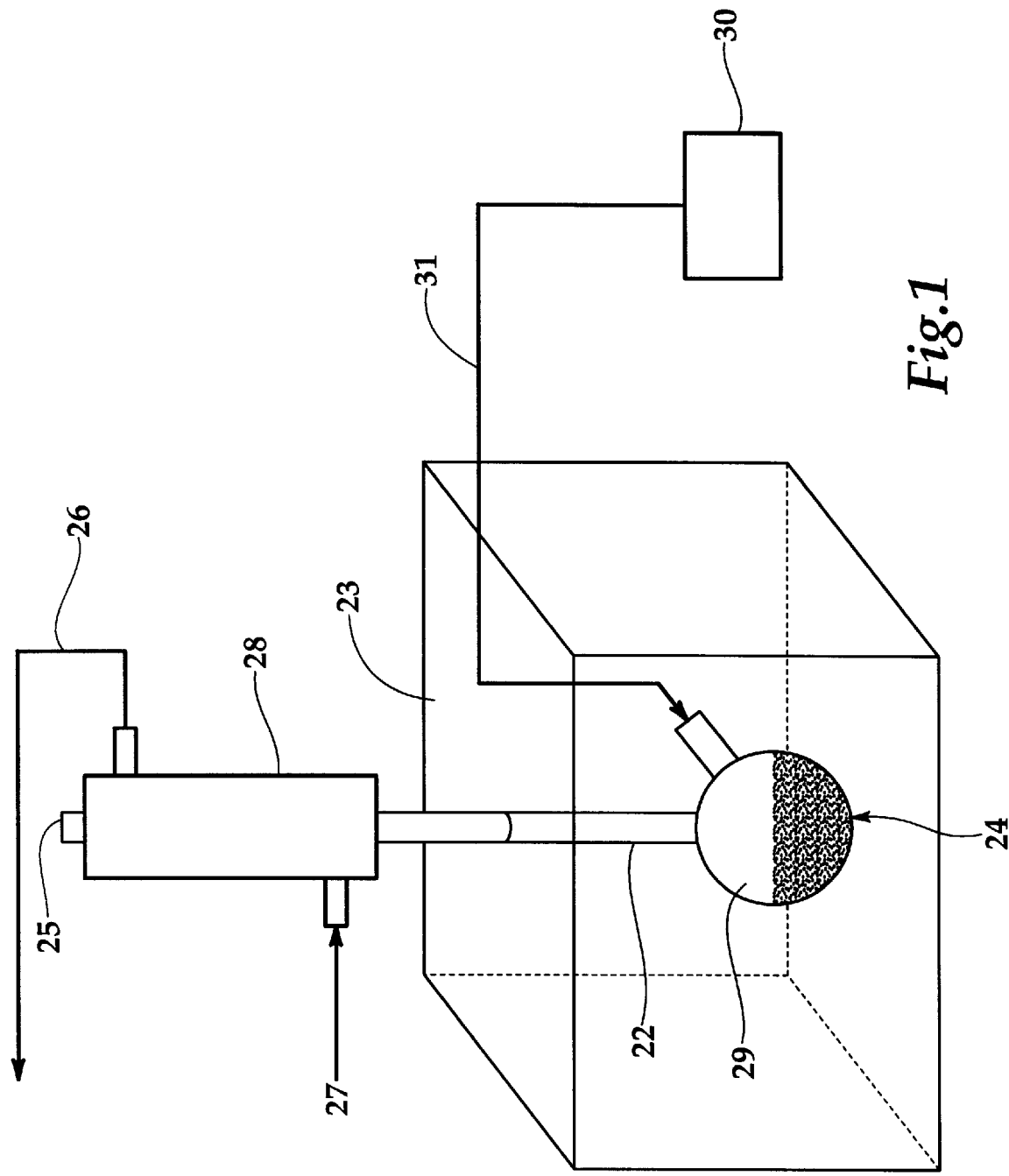
FIG. 1 shows a batch laboratory wet oxidation system operating within a microwave oven.

A typical laboratory microwave reactor system to study experimental conditions for wet oxidation is shown in FIG. 1. A standard microwave energy oven 23 of 900 watts with a frequency of 2450 MHz was slightly modified to allow external attachments. A 1000 ml laboratory round bottom glass flask or retort 29 was employed filled approximately one-third with activated carbon 24, optionally spiked with 0.02% Pt catalyst, while an air bleed 31 fed enriched air into the side of the retort 29 coming from an oxygen generator 30. Water containing organic contamination was added to the retort 29 while it is modified upward into a reflux condenser 28 fed with cooled water 27 going into and slightly warmer water 26 out. The condensed liquid returned via the neck surface 22 to the retort 29 while the excess gases 25 generated passed out the condenser 28. In use this batch system ran for a fixed time with liquid samples from the retort 29 taken and analyzed for organic material at the beginning and end of each run. In addition the air bleed 31, either with or without enriched oxygen, was optionally employed.

Figure 2:
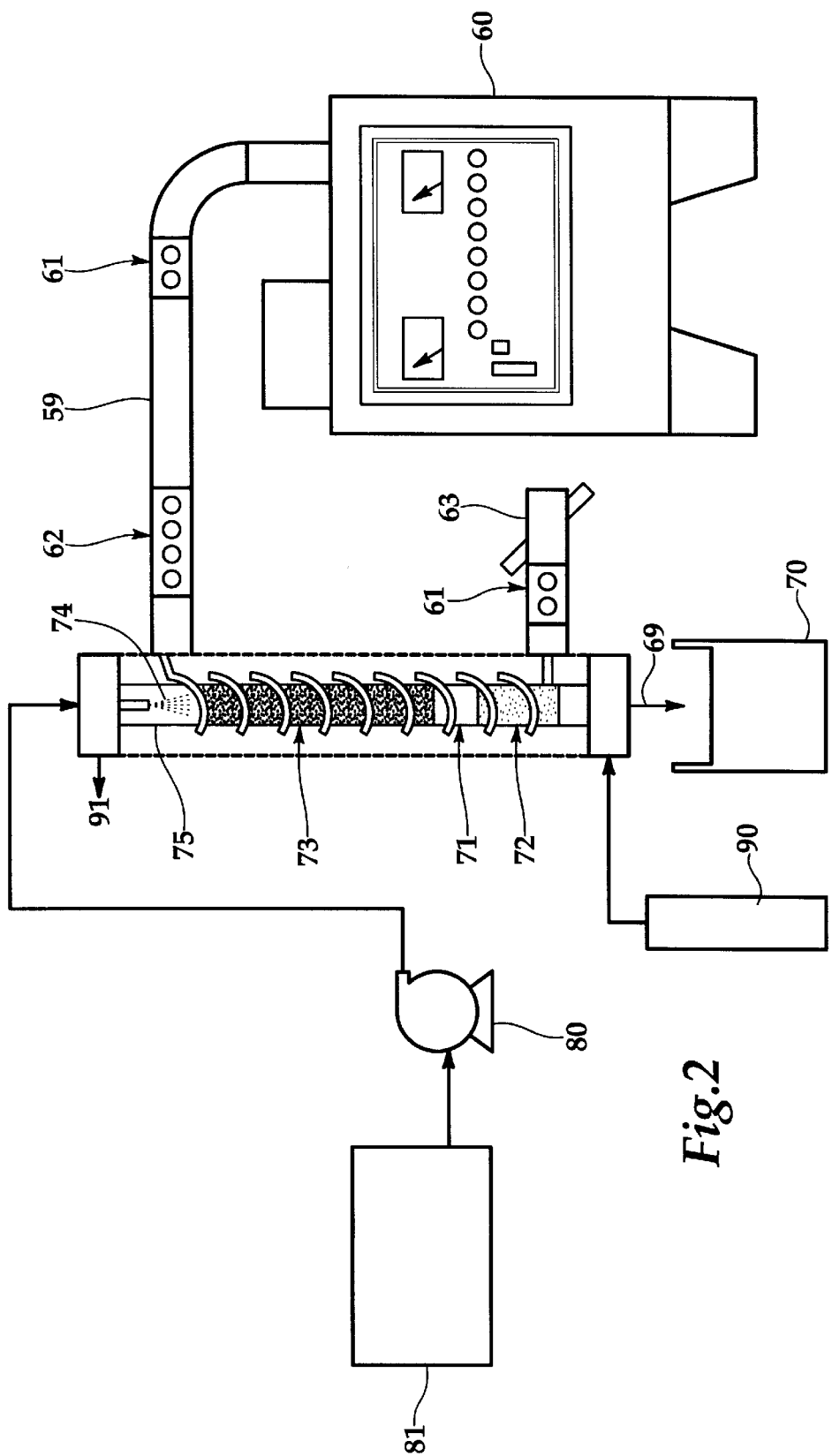
FIG. 2 shows a flow process for microwave enhancement of wet oxidation.

FIG. 2 shows a typical flow process for wet oxidation built into the waveguide, a microwave cavity, fed by a microwave generator. The microwave generator 60 is capable of three kilowatt radiofrequency energy at a frequency of 2450 MHz. Two 60 dB couplers 61 are located toward the end of the waveguide 59 which has a common tuner 62. A water terminator 63 ends the waveguide 59. The reactor column 75 made of quartz is contained within the waveguide 59. This reactor has doughnut supports 71 to physically stabilize the column 75 which is packed with a carbonaceous material 73 which readily absorbs microwave energy. The bottom of the reactor column 75 has a ceramic packing 72 acting as a filter. The contaminated water 81 is stored and then pumped 80 into the top of the column 75 where a sprayer 74 distributes the water over the carbonaceous bed 73 giving trickle down flow. The microwave enhanced wet oxidation purified water 69 discharges from the bottom of the column 75 into a clean water receiving tank 70. In operation the contaminated water 81 contains enough dissolved oxygen to allow the wet oxidation process to readily occur.

EXAMPLE 1

The experimental setup as shown in FIG. 1 was employed to determine the efficiency of the oxidation of hydrazine by microwave enhanced wet oxidation. The tests utilized 600–1000 ppm hydrazine solutions and about 300 ml of activated carbon with the conditional employment of a platinum catalyst. Air, optionally enriched with oxygen, was introduced into the bottom of the flask for some tests. In each test the contaminated water of known hydrazine concentration and activated carbon were placed in the flask or retort reactor and exposed to microwaves for a fixed time period. At the end of the reaction time the hydrazine concentration of the solution was determined. All hydrazine concentrations were measured by the colorimetric method of ASTM D 1385-88.

As shown in Table 1, the tests proved that the proposed system can substantially destroy hydrazine, and in tests numbers 4, 6, and 7, hydrazine levels fell below detection limits. The primary factor in these tests was reaction time. The presence of platinum catalyst apparently had no significant effect as observed from tests 1 and 5. Further the use of oxygen enriched air had little effect, from tests 1 and 3, in this dilute hydrazine experiment.

EXAMPLE 2

Additional tests using the experimental setup of Example 1 were obtained to confirm that the observed hydrazine reductions were due to microwave energy driven reactions and not adsorption by the activated carbon.

In one test a mixture of activated carbon and hydrazine solution was mixed and boiled for eight minutes, and the hydrazine concentration changed from about 800 ppm to 400 ppm. Further boiling for 24 minutes did not reduce further the hydrazine concentration. Microwaves were then applied and the hydrazine level was reduced to a non-detectable value.

TABLE 1

Results of Batch Tests for Microwave-Induced Destruction of Hydrazine

| Run No. | Reaction Time, min. | Initial Conc., ppm | Final Conc., ppm | Destruction Efficiency, % | Remark |
|---|---|---|---|---|---|
| 1 | 8 | 633 | 142 | 78 | 0.02% Pt Activated Carbon (A/C) was used with enriched air |
| 2 | 16 | 633 | 11 | 98 | Same as above |

TABLE 1-continued

Results of Batch Tests for Microwave-Induced Destruction of Hydrazine

| Run No. | Reaction Time, min. | Initial Conc., ppm | Final Conc., ppm | Destruction Efficiency, % | Remark |
|---|---|---|---|---|---|
| 3 | 8 | 633 | 100 | 84 | 0.02% Pt A/C without enriched air |
| 4 | 16 | 633 | 0 | 100 | Same as above |
| 5 | 8 | 316 | 40 | 87 | A/C with enriched air |
| 6 | 16 | 316 | 0 | 100 | Same as above |
| 7 | 8 | 316 | 10 | 97 | A/C without enriched air |
| 8 | 16 | 316 | 0 | 100 | Same as above |

In another test cold hydrazine solution was mixed with activated carbon and stirred, and the concentration of hydrazine changed from 633 ppm to 300 ppm after 8 minutes and to 100 ppm after 16 minutes. Applying microwave energy completely destroyed the hydrazine within 8 minutes. Further boiling of the solution produced no further detectable hydrazine.

In a further test only hydrazine solution was placed in the microwave oven for 8 minutes, and no change in hydrazine concentration occurred.

Finally a hydrazine solution was boiled for 8 minutes with a conventional heating mantle while purging the solution with enriched air. The concentration of the hydrazine changed only from 633 ppm to 601 ppm.

These tests confirm that microwave enhanced wet oxidation employing activated carbon or its equivalent definitely was an effective means of hydrazine oxidation.

EXAMPLE 3

Figure 3:
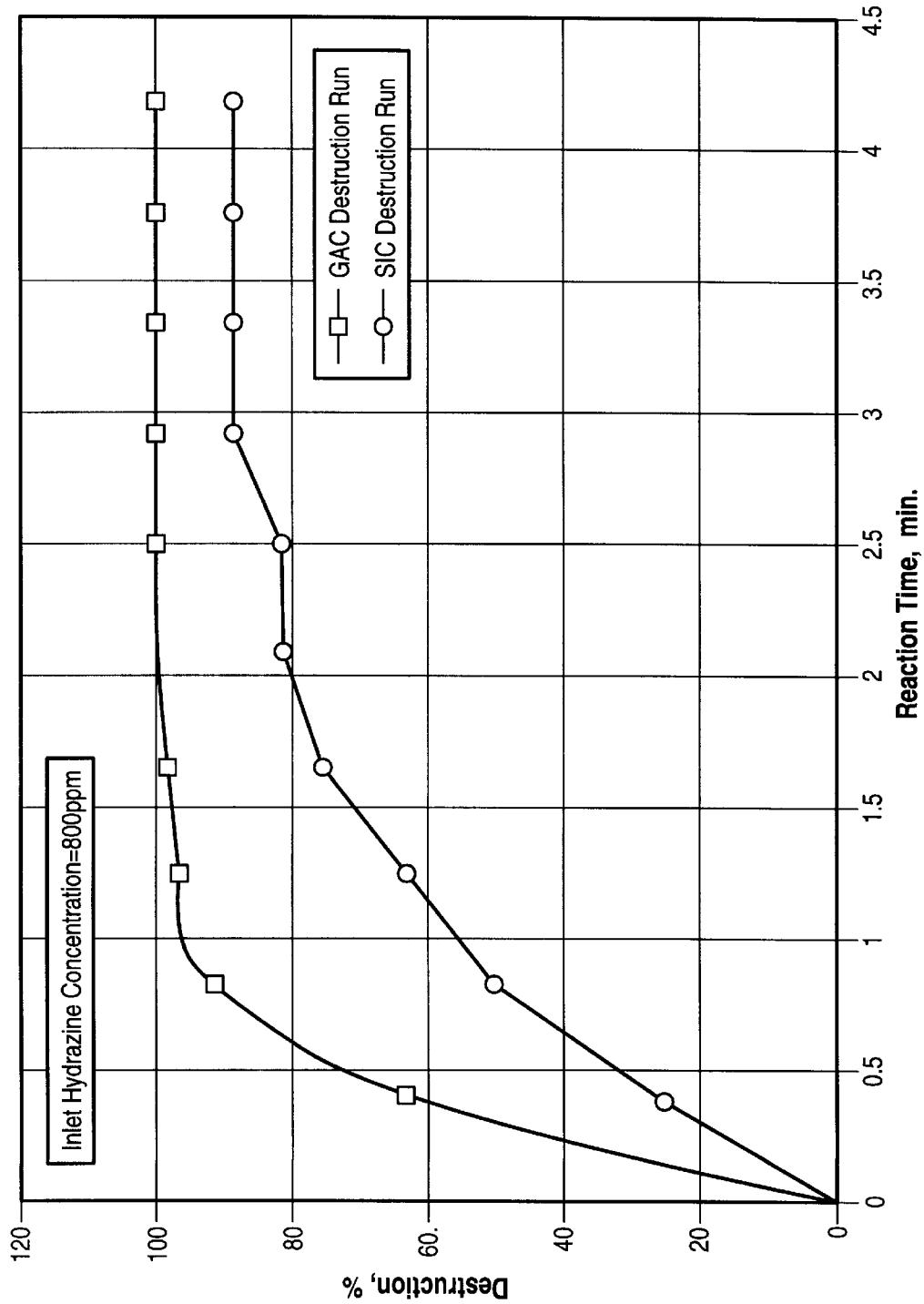
FIG. 3 shows the decomposition of microwave enhanced wet oxidation of hydrazine solutions.

Using the flow process of FIG. 2, tests were conducted to determine the destruction efficiency under continuous conditions. Two packing materials were employed in the quartz reactor tube, either activated carbon (CECARBON GAC 610) or silicon carbide (SiC). The 800 ppm hydrazine solution flowed at 164 ml/min through the bed, and the microwave power was one kW. FIG. 3 shows the favorable results, especially for activated carbon. The SiC was not as effective since it did not internally adsorb the hydrazine; conversely the Granulated Activated Carbon (GAC) with a large internal pore surface area is an effective adsorber of organics.

EXAMPLE 4

To determine the generality of this microwave enhanced wet oxidation, the setup of FIG. 1 was employed to environmentally clean water contaminated with a chlorinated solvent, 2-chloro-2-methylpropane. For this laboratory test the bleed gas utilized was pure oxygen. The organic carbon content of the solution was measured with a Total Organic Carbon (TOC) Analyzer, Model 700, made by O.I. Corporation.

The reactor flask or retort had 500 ml of solution with a TOC of 144 ppm while SiC was employed as the carbonaceous material. The test used 720 watts of microwave power. After 8 minutes the TOC level was down to 30 ppm, after 16 minutes 8 ppm, and after 24 minutes 4 ppm. This resulted in over 97 percent destruction of the chlorinated contamination.

A second test utilized 50 grams GAC as the carbonaceous material along with 500 ml of solution with a TOC of 182 ppm. Similar results as before were obtained with a destruction of 96 percent after 40 minutes of 720 watt microwave power.

A third test was similar to the second except the GAC contained 0.02% Pt catalyst. Again after 40 minutes at 720 watt microwave power, the destruction reached 94 percent.

A final test employed pellet sized GAC with 50 ml of contaminated solution. After only 16 minutes of 720 watt microwave power, the TOC destruction reached better than 95 percent.

These test proved that microwave enhanced wet oxidation effectively destroyed the chlorinated organics.

EXAMPLE 5

To determine further the generality of this microwave enhanced wet oxidation, the setup of FIG. 1 was employed to environmentally clean water contaminated with butanol and adiponitrile. The tests were similar to that of Example 4.

In the first test 30 grams of GAC with 0.02% Pt catalyst were used with 500 ml of butanol solution with a TOC of 500 ppm. After 80 minutes of 720 watt microwave energy, the destruction reached 84 percent. A second run was employed with an initial 1200 ppm TOC of butanol. The destruction reached about 84 percent after 80 minutes for this single stage.

For the adiponitrile test the initial TOC was 1000 ppm and after 80 minutes of 720 watt microwave energy, the destruction leveled out at about 55 percent. For this adiponitrile organic material to obtain a higher efficiency of destruction more than one batch stage is required; thus, shifting to a multistage continuous process would be required.

A process for wet oxidation of organic matter comprising the mixing in the presence of water of said matter with a bed of carbonaceous material and exposing said bed to microwaves. The matter and the water are potentially premixed, especially if the organic matter is already present in a water base which is often the case if said matter is a category of hazardous substances. In best mode operation the water is substantially saturated with oxygen either from air or separately generated. In many instances the water is supplied by a spraying system. The microwaves are radio-frequency energy selected from the range consisting of 500 to 5000 Mhz. The carbonaceous material is selected from the group consisting of activated carbon, char, soot, pyrolytic carbon, carbon black, activated charcoal, and silicon carbide, all of which are good absorbers of microwave energy. The bed is likely a form of fluidized bed, fixed bed, semi-fluidized bed, suspended bed, moving bed, and combinations thereof.

A process for wet oxidation of hazardous organic material, such as hydrazine, 2-chloro-2-methylpropane, butanol, and adiponitrile, comprising the mixing in the presence of water said hazardous material with a bed of carbonaceous material, chosen from activated carbon, char, soot, pyrolytic carbon, carbon black, activated charcoal, and metal carbides, and then exposing said bed to microwaves selected from the frequency range consisting of 500 to 5000 Mhz. The water is often fed by a spraying system while the bed is of the form of one or more fluidized beds, fixed beds, semi-fluidized beds, suspended beds, and moving beds.

The foregoing description of the specific embodiments will so fully reveal the general nature of the invention that others can, by applying current knowledge, readily modify and/or adapt for various applications such specific embodiments without departing from the generic concept, and there-fore such adaptations or modifications are intended to be comprehended within the meaning and range of equivalents of the disclosed embodiments. It is to be understood that the phraseology or terminology herein is for the purpose of description and not of limitation.

I claim:

1. A process for wet oxidation of organic matter comprising mixing in the presence of water that is substantially saturated with oxygen said matter with a bed of carbonaceous material and enhancing the wet oxidation by exposing said bed to microwaves.

2. A process for wet oxidation of hazardous organic material comprising mixing in the presence of water that is substantially saturated with air said hazardous material with a bed of carbonaceous material which is selected from the group consisting of activated carbon, char, soot, pyrolytic carbon, carbon black, activated charcoal, and silicon carbide; and enhancing the wet oxidation by exposing said bed to microwaves selected from the frequency range consisting of 500 to 5000 MHz.

3. A process for wet oxidation of hazardous organic material comprising mixing in the presence of water said hazardous organic material which is selected from the group consisting of hydrazine, 2-chloro-2-methylpropane, butanol, and adipontrile with a bed of carbonaceous material which is selected from the group consisting of activated carbon, char, soot, pyrolytic carbon, carbon black, activated charcoal, and silicon carbide; and enhancing the wet oxidation by exposing said bed to microwaves selected from the frequency range consisting of 500 to 5000 MHz.

* * * * *